June 15, 1937.   P. R. ANGELICA   2,083,630
SINKER
Filed Dec. 21, 1936

Inventor
Patrick R. Angelica.

By Clarence A. O'Brien
Hyman Berman
Attorneys

Patented June 15, 1937

2,083,630

UNITED STATES PATENT OFFICE 2,083,630

SINKER

Patrick Robert Angelica, Secaucus, N. J.

Application December 21, 1936, Serial No. 117,061

2 Claims. (Cl. 43—52)

This invention relates to fishing tackle and more especially to improvements in sinkers or weights attached to fishing lines.

The object of the present invention, primarily is to simplify the operation of disconnecting a sinker from a fishing line and replacing it with another with consequent saving in both time and labor. To this end, the invention embodies certain novel changes in or additions to the sinker structure whereby the latter is adapted to the purposes of the invention in a simple and economic manner.

Further objects and advantages of the invention will be apparent from the following description, considered in connection with the accompanying drawing wherein:—

Figure 1:
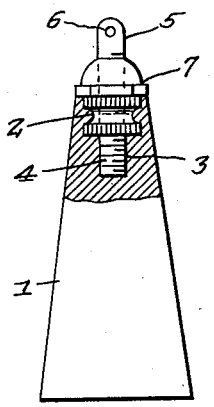
Figure 2:
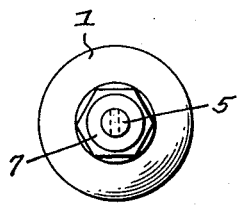

Figure 1 is a view of the improved sinker, partly in elevation and partly in section and Figure 2 is a top view thereof.

This sinker is formed with the usual tapered body 1 of lead but a knurled nut 2 is placed at the top of the body and molded into the sinker at the same time the sinker body is molded; an internally screw threaded bore or socket 3 being simultaneously molded in the body below and concentric with the threaded bore of the nut which opens directly thereinto as will be understood from the sectionalized portion of Figure 1. Screwed into the nut and socket is the threaded shank 4 of a needle eye bolt 5 to the eye 6 of which a fishing line is to be securely fastened. The needle bolt is fitted with a dome-shaped nut 7 which is adapted to be screwed down tight against the top of the sinker body with a small hand wrench or by hand. When so tightened the dome-shaped nut serves as a lock for the needle eye bolt and prevents the latter from working loose from the sinker body.

The needle eye bolt is intended to be permanent, more or less, with the fishing line to which it is attached and need not be detached from the line when changing sinkers since the same sized knurled nut will be used in all sinkers regardless of sinker size or weight. In other words, all that a fisherman is required to do to effect a change of sinkers is to loosen the dome-shaped nut, unscrew the sinker from the bolt, screw on the desired sinker and then tighten the dome-shaped nut. There is no need of unfastening tight and wet knots in line and consequently a complete change of sinkers is possible in a very short time.

The advantages of the invention are manifest. A fisherman with wet and slimy hands does not have to spend time in unfastening knots which have become water soaked and consequently very difficult to untie. He may simply pick up a small hand wrench and unfasten the dome-shaped nut, unscrew the sinker from the bolt and replace it with another. The knurled nut molded into the sinker will stand as much pull and knocking around as any fishing line will and it is so molded into the sinker body that it will never come loose with ordinary usage and will stand a tremendous pull.

The invention is applicable to all types of sinkers including the feather trolling rig, lead squids and pyramid-shaped sinkers.

Having thus described the invention, what is claimed is:—

1. A sinker for a fishing line comprising a lead body, a knurled nut imbedded in the body at one end thereof, a bolt having an eye for attachment with a fishing line and a screw threaded shank engageable with the said nut, and a lock nut on said bolt to be screwed down against the top of the sinker body to lock the said bolt to the said body.

2. A sinker for a fishing line comprising a molded tapering body of lead having a molded-end nut at the smaller end of the body and a threaded socket below and concentric with the said nut and molded into the center simultaneously with the molding of the sinker body, the nut and the socket being correspondingly threaded and opening in axial alignment through the said smaller end of the sinker body.

PATRICK ROBERT ANGELICA.